US009413617B2

(12) United States Patent
Kim (10) Patent No.: US 9,413,617 B2
(45) Date of Patent: *Aug. 9, 2016

(54) METHOD AND SYSTEM FOR REMOTE CONTROL BETWEEN MOBILE DEVICES

(71) Applicant: Samsung Electronics Co. Ltd., Suwon-si, Gyeonggi-do (KR)

(72) Inventor: Tae Seon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

This patent is subject to a terminal disclaimer.

(21) Appl. No.: 13/944,271

(22) Filed: Jul. 17, 2013

(65) Prior Publication Data

US 2013/0304894 A1    Nov. 14, 2013

Related U.S. Application Data

(63) Continuation of application No. 13/089,805, filed on Apr. 19, 2011, now Pat. No. 8,509,730.

(30) Foreign Application Priority Data

Feb. 14, 2011   (KR) .......................... 10-2011-0012615

(51) Int. Cl.
*H04L 12/24* (2006.01)
*H04M 3/51* (2006.01)
(Continued)

(52) U.S. Cl.
CPC .............. *H04L 41/50* (2013.01); *H04L 67/125* (2013.01); *H04M 3/5116* (2013.01); *H04W 4/12* (2013.01); *H04W 4/22* (2013.01); *H04W 76/007* (2013.01); *H04L 67/28* (2013.01); *H04M 2203/1016* (2013.01); *H04M 2207/18* (2013.01)

(58) Field of Classification Search
CPC ..... H04W 76/007; H04W 4/22; H04W 64/00; H04W 4/02; H04W 4/12; H04M 11/04; H04M 2242/04; H04M 3/5116; H04M 2250/56; H04L 65/40; H04L 67/18; B60R 25/102; G01S 19/17
See application file for complete search history.

(56) References Cited

U.S. PATENT DOCUMENTS 6,711,399 B1 *   3/2004   Granier ...................... 455/404.1
6,853,841 B1 *   2/2005   St. Pierre ...................... 455/420

(Continued)

FOREIGN PATENT DOCUMENTS

KR    10-2005-0020111 A    3/2005
KR    10-2010-0070578 A    6/2010

*Primary Examiner* — Matthew Sams
(74) *Attorney, Agent, or Firm* — Jefferson IP Law, LLP (57) ABSTRACT

A remote control method between mobile devices and a system thereof are provided. The system includes a server including a control command list for controlling a help-requesting device. The server authenticates a remote control authorization of a control device and relays a data packet communication between the help-requesting device and the control device. The help-requesting device transmits a help request message to the control device through the server. The control device acquires the authorization to remotely control the help-requesting device from the server and then transmits a control command for controlling the help-requesting device to the help-requesting device through the server. The help-requesting device executes the received control command and then transmits execution result data to the control device through the server. The control device outputs the execution result data received from the help-requesting device.

19 Claims, 8 Drawing Sheets

(51) Int. Cl.
   *H04W 4/12* (2009.01)
   *H04W 4/22* (2009.01)
   *H04W 76/00* (2009.01)
   *H04L 29/08* (2006.01)

(56) References Cited

U.S. PATENT DOCUMENTS

| | | | |
|---|---|---|---|
| 2003/0139179 A1* | 7/2003 | Fuchs et al. | 455/426 |
| 2004/0166840 A1* | 8/2004 | Kawamura | 455/419 |
| 2004/0198386 A1* | 10/2004 | Dupray | 455/456.1 |
| 2005/0001720 A1* | 1/2005 | Mason et al. | 340/539.13 |
| 2005/0009511 A1* | 1/2005 | Bostrom et al. | 455/419 |
| 2005/0282518 A1* | 12/2005 | D'Evelyn et al. | 455/404.1 |
| 2006/0034204 A1* | 2/2006 | Lee | H04W 76/027 370/312 |
| 2006/0158329 A1* | 7/2006 | Burkley et al. | 340/539.13 |
| 2006/0258346 A1* | 11/2006 | Lapstun et al. | 455/419 |
| 2008/0064362 A1* | 3/2008 | An et al. | 455/404.1 |
| 2009/0124271 A1* | 5/2009 | Roundtree et al. | 455/466 |
| 2009/0186596 A1* | 7/2009 | Kaltsukis | 455/404.2 |
| 2009/0191839 A1 | 7/2009 | Cannon, Jr. | |
| 2009/0197563 A1* | 8/2009 | Yasrebi et al. | 455/404.1 |
| 2012/0069131 A1 | 3/2012 | Abelow | |
| 2012/0208485 A1* | 8/2012 | Kim | 455/404.1 |
| 2012/0278408 A1 | 11/2012 | Seferian et al. | |
| 2012/0293605 A1 | 11/2012 | Seferian et al. | |

* cited by examiner

METHOD AND SYSTEM FOR REMOTE CONTROL BETWEEN MOBILE DEVICES

PRIORITY

This application is a continuation of U.S. patent application Ser. No. 13/089,805, filed on Apr. 19, 2011, which claims the benefit under 35 U.S.C. §119(a) of a Korean patent application filed on Feb. 14, 2011 in the Korean Intellectual Property Office and assigned Serial No. 10-2011-0012615, the entire disclosure of which is hereby incorporated by reference.

BACKGROUND OF THE INVENTION

1. Field of the Invention

The present invention relates to remote control technology for mobile devices. More particularly, the present invention relates to a remote control method and system in which a control device receiving an urgent request for help remotely controls a help-requesting device through a server and acquires information on surroundings of the help-requesting device.

2. Description of the Related Art

With modern scientific technologies being advanced dramatically, various mobile devices such as a cellular phone, a Personal Digital Assistant (PDA) and a smart phone have become increasingly popularized. Recent mobile devices are provided with various optionally useful functions and applications as well as their inherent and essential functions. One of additive functions is an SOS service for users who are in danger, had an accident or involved in any other type of emergency.

When any emergency situation occurs, a user who carries a mobile device available for a SOS service of the related art may try to transmit an urgent request for help or to output an alert sound by pressing a hot key or any other prescribed keys. The transmitted urgent request or the output alert sound is merely a method for asking for other people's help or gives a warning of a dangerous person. However, the SOS service of the related art may not provide any information about the user's emergency situations.

SUMMARY OF THE INVENTION

Aspects of the present invention are to address at least the above-mentioned problems and/or disadvantages and to provide at least the advantages described below. Accordingly, an aspect of the present invention is to provide a remote control method and system in which a control device receiving an urgent request for help that remotely controls a help-requesting device through a server and acquires information on surroundings of the help-requesting device.

According to an aspect of the present invention, a method for a remote control between mobile devices is provided. The method includes, at a help-requesting device, transmitting a help request message to a control device through a server, at the control device, acquiring an authorization to remotely control the help-requesting device from the server, at the control device, transmitting a control command for controlling the help-requesting device to the help-requesting device through the server, and at the help-requesting device, executing the control command and then transmitting execution result data to the control device.

According to another aspect of the present invention, a system for a remote control between mobile devices is provided. The system includes a server including a control command list for controlling a help-requesting device, and for authorizing a remote control authority of a control device and for relaying a data packet communication between the help-requesting device and the control device, the help-requesting device for transmitting a help request message to the control device through the server, for executing a control command received from the control device through the server, and for transmitting execution result data to the control device through the server, and the control device for acquiring the authorization to remotely control the help-requesting device from the server, for transmitting the control command for controlling the help-requesting device to the help-requesting device through the server, and for outputting the execution result data received from the help-requesting device.

In various aspects of the present invention, the control device receiving a help request from the help-requesting device can remotely control the help-requesting device and then obtain information about surroundings of the help-requesting device. Therefore, in comparison with SOS services of the related art, the SOS service according to exemplary embodiments of the present invention may be more useful in helping or rescuing a user who is in danger, had an accident or involved in any other type of emergency.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
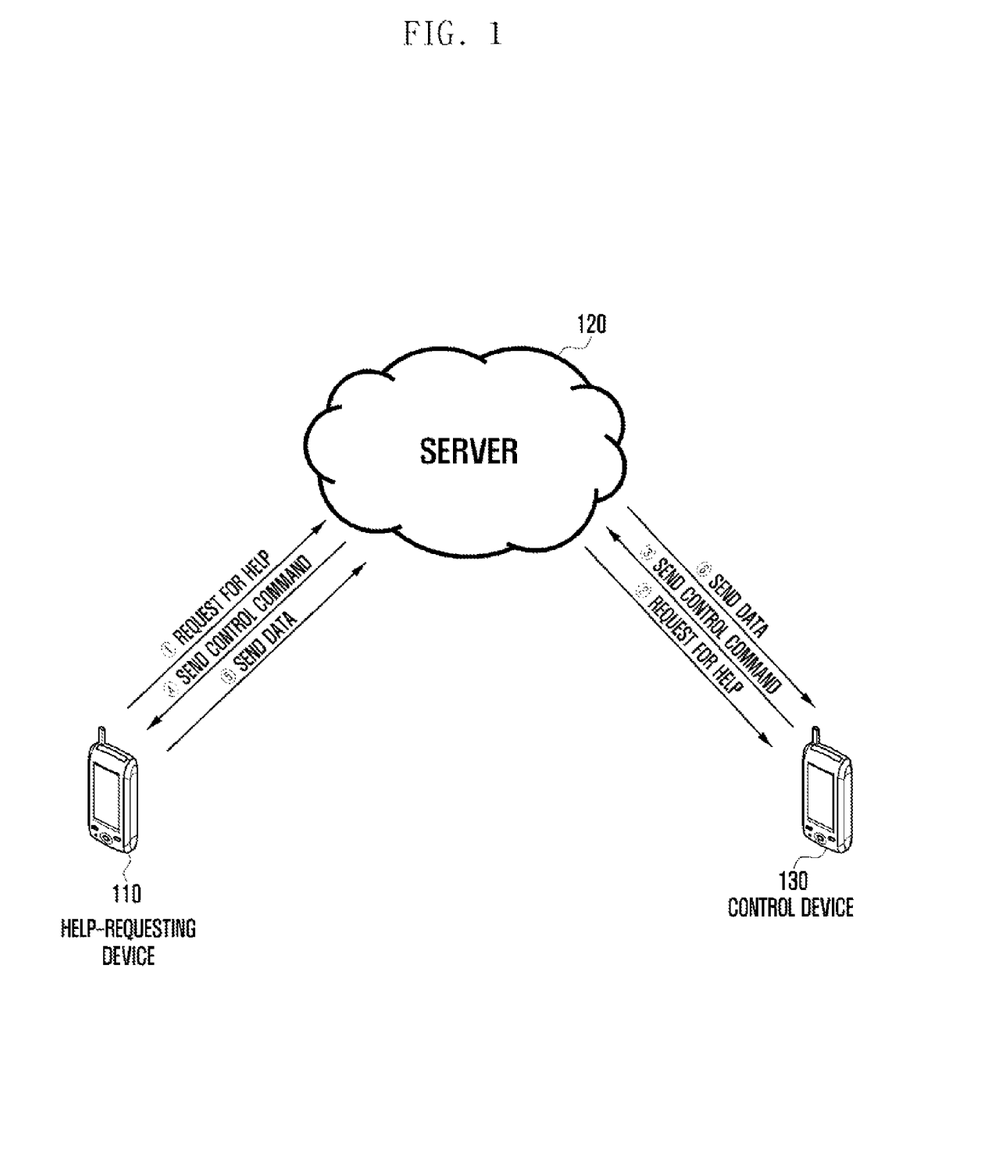
FIG. 1 is a schematic view illustrating a configuration of an SOS service system according to an exemplary embodiment of the present invention.

FIG. 1 is a schematic view illustrating a configuration of an SOS service system according to an exemplary embodiment of the present invention.

Referring to FIG. 1, the SOS service system includes a help-requesting device 110, a server 120, and a control device 130.

The help-requesting device 110 is a device that transmits an urgent request for help to the control device 130, registered in advance, in case of an emergency. The help-requesting device 110 may register in advance a list of available control devices with the server 120. These registered control devices can control the help-requesting device 110 in an emergency. The help-requesting device 110 receives a control command from the control device 130 and then performs a particular function of the help-requesting device 110 in response to the received control command. Also, the help-requesting device 110 transmits data, created as the result of command execution, to the control device 130 through the server 120.

The server 120 relays a data packet communication between the help-requesting device 110 and the control device 130. In an exemplary implementation, the server 120 may use a Packet Switched Data Network (PSDN). The server 120 has a list of control devices that are capable of controlling the help-requesting device 110 in an emergency. Additionally, the server 120 has a list of standardized control commands to control the help-requesting device 110. By using the list of the standardized control commands, a remote control may be allowed between different kinds of devices such as a mobile phone and a notebook.

The control device 130 controls the help-requesting device 110 at a distance when the help-requesting device 110 is in emergency situations. The main purpose for which the control device 130 remotely controls the help-requesting device 110 is to acquire information on surroundings of the help-requesting device 110. According to an exemplary embodiment of the present invention, the control device 130 may record audio and/or video or capture an image of surroundings of the help-requesting device 110 through a recorder or a camera included in the help-requesting device 110 or acquire location information about the help-requesting device 110.

A remote control method according to an exemplary embodiment of the present invention will be described below based on the above described SOS service system.

When any emergency situation occurs, the help-requesting device 110 transmits an urgent request for help to the server 120. The server 120 delivers a received request for help to the control device 130. Next, the control device 130 transmits a control command for controlling operations of the help-requesting device 110 to the server 120. The server 120 delivers a received control command to the help-requesting device 110.

In response to a control command received from the server 120, the help-requesting device 110 performs a particular function. In an exemplary implementation, a particular function may be at least one of a recorder driving function, a camera driving function, and a location information acquisition function. Also, the help-requesting device 110 transmits data, created as the result of a command execution, to the server 120. The server 120 delivers received result data to the control device 130.

The control device 130 may acquire information on surroundings of the help-requesting device 110 by verifying result data received from the server 120. For example, if result data contains the sound of a train, this denotes that the help-requesting device 110 may be located near a railroad or train station. Also, image information in record data may further provide detailed information on surroundings of the help-requesting device 110.

Figure 2:
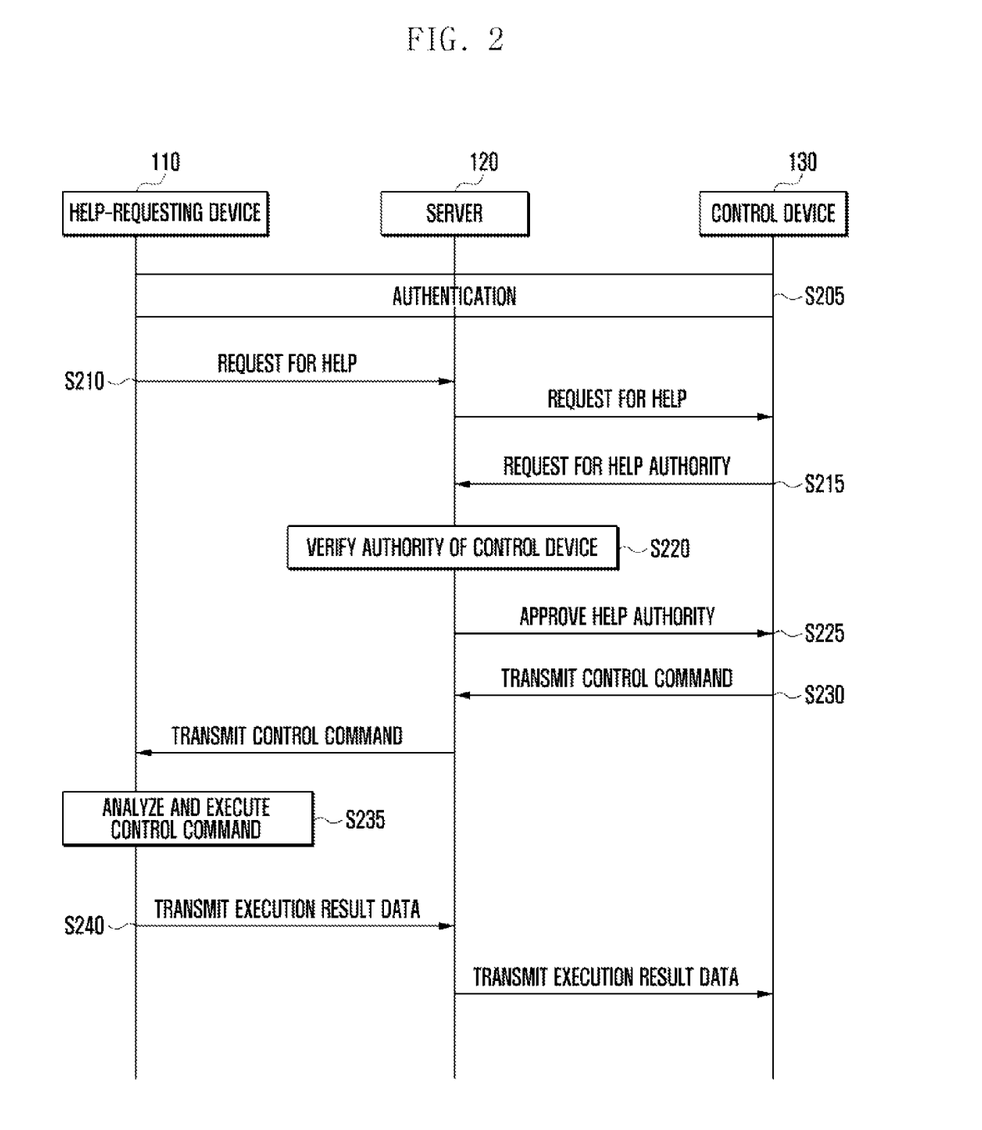
FIG. 2 is a flow diagram illustrating an SOS service procedure according to an exemplary embodiment of the present invention.

FIG. 2 is a flow diagram illustrating an SOS service procedure according to an exemplary embodiment of the present invention.

Referring to FIG. 2, at the outset, the help-requesting device 110, the server 120 and the control device 130 perform an authentication process such that a list of the control devices 130 to remotely control the help-requesting device 110 in an emergency is registered in step S205. Registration of a control device list will be described in more detail with reference to FIG. 3.

When any emergency situation occurs, the help-requesting device 110 transmits a help request message to the server 120 in step S210. The help-requesting device 110 may select an SOS service menu or use a preset hot key to perform transmission of the help request message. In most cases, the preset hot key for performing transmission of the help request message may be used.

Although an SOS service begins with transmission of the help request message by the help-requesting device 110 in FIG. 2, the SOS service is not always initiated by the help-requesting device 110. If the help-requesting device 110 is in an extreme emergency situation, it is necessary for the control device 130 to initiate the SOS service. Therefore, according to an exemplary embodiment of the present invention, the control device 130 attempts to make a call with the help-requesting device 110 and, if failing to receive a response several times more than preset response times, initiates the SOS service to control the help-requesting device 110 at a distance. It is assumed herein that the help-requesting device 110 initiates the SOS service.

The server 120 receives the help request message from the help-requesting device 110 and then transmits it to the control device 130. The control device 130 transmits a help authority request message to the server 120 to acquire an authorization to remotely control the help-requesting device 110 in step S215.

The server 120 verifies a list of control devices registered in advance and then determines whether the device transmitting the help authority request message is an authorized device in step S220. If the control device list contains the device transmitting the help authority request message, the server 120 transmits a help authority approval message to the control device 130 in step S225.

The control device 130 can control the help-requesting device 110 at a distance. For this, the control device 130 transmits a control command to the server 120 in step S230. The control command is a standardized command for a remote control and may be transmitted through a Short Message Service (SMS). Table 1 exemplarily shows standardized control commands. The server 120 may have in advance a list of control commands as shown in Table 1.

TABLE 1

| Command | Device Operation |
|---|---|
| AAAAA | Drive Recorder |
| BBBBB | Drive Camera |
| CCCCC | Acquire Location Information |
| ... | ... |

For example, if the help-requesting device 110 attempts to drive a camera, the control device 130 transmits an SMS message "BBBBB" to the server 120. Then the server 120 analyzes a received SMS message and then transmits a control command for driving a camera to the help-requesting device 110.

According to an exemplary embodiment of the present invention, when the control device 130 transmits an SMS message "BBBBB" to the server 120 to drive a camera of the help-requesting device 110, the server 120 may forward the received SMS message "BBBBB" to the help-requesting device 110. The help-requesting device 110 recognizes a camera driving command by analyzing the received SMS message "BBBBB" and then drives its own camera. In this case, the help-requesting device 110 also has a list of control commands as shown in Table 1.

The help-requesting device 110 performs a particular function in response to a control command that the control device 130 provides in step S235. The particular function may be at least one of a recorder driving function, a camera driving function, and a location information acquisition function. Also, the help-requesting device 110 transmits data created as the result of control command execution to the control device 130 through the server 120 in step S240.

The control device 130 may acquire information on surroundings of the help-requesting device 110 through result data of control command execution such as recorded sound data, recorded video data, captured image data, or location information.

Figure 3:
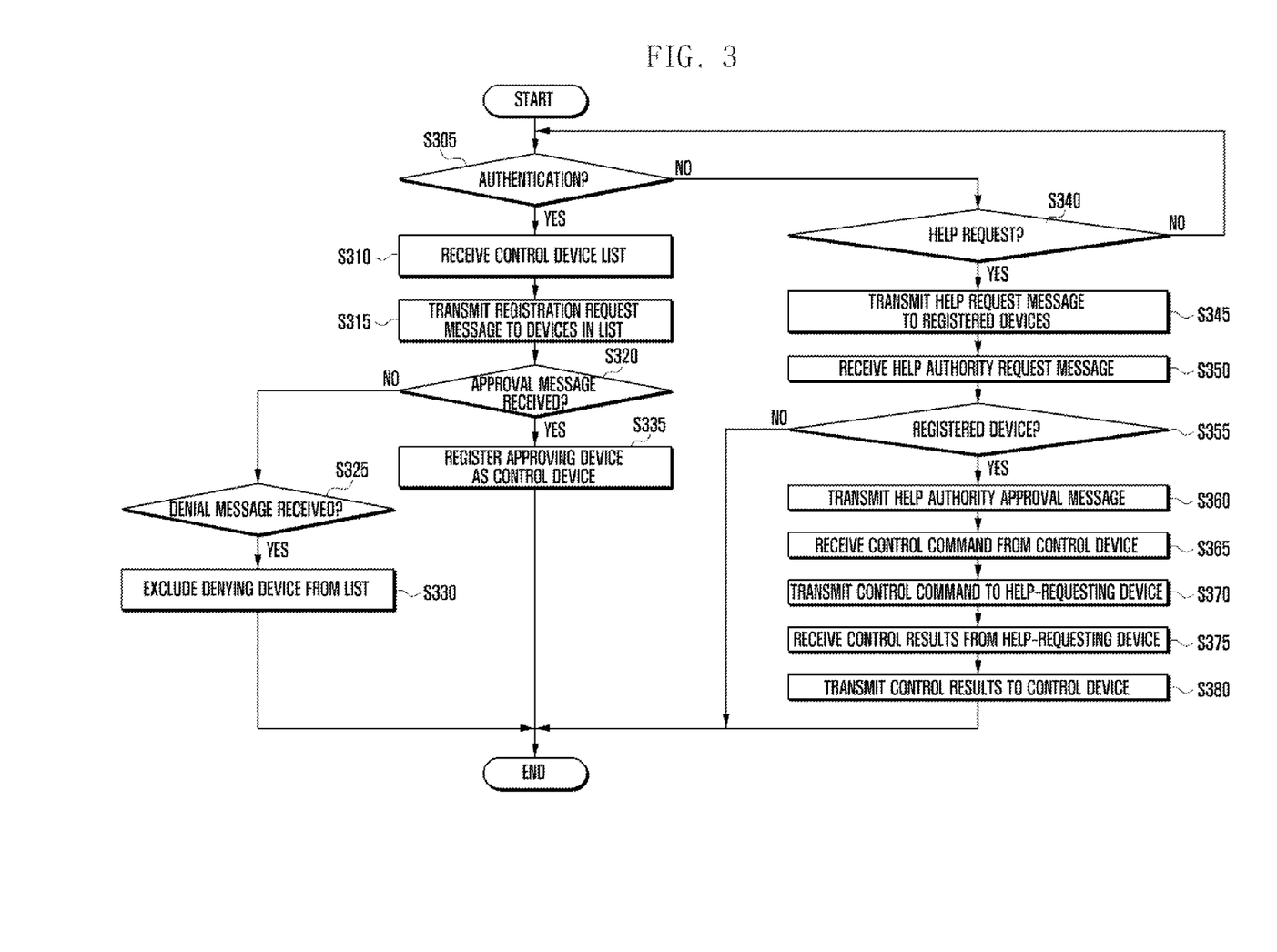
FIG. 3 is a flow diagram illustrating an operation process of a server for an SOS service according to an exemplary embodiment of the present invention.

FIG. 3 is a flow diagram illustrating an operation process of a server for an SOS service according to an exemplary embodiment of the present invention.

Referring to FIG. 3, at the outset, the server 120 determines whether to perform an authentication process in step S305. The server 120 proceeds to step S310 to perform the authentication process or to step S340 to perform a help request process.

In a case of performing the authentication process, the server 120 receives a control device list from the help-requesting device 110 in step S310. The control device list is a list that indicates control devices that are capable of remotely controlling the help-requesting device 110 in an emergency. The control device list may be created by a user of the help-requesting device 110 and may contain, for example, parents', friends', or acquaintances' devices.

The server 120 transmits a registration request message to each device contained in the control device list to determine whether to register such devices as control devices for the help-requesting device 110 in step S315. The server 120 determines whether an approval message is received from each device in the control device list in step S320. If the approval message is received, the server 120 registers the device transmitting the approval message as an authenticated control device in step S335. However, if a denial message is received in step S325, the server 120 excludes the device transmitting the denial message from the control device list in step S330.

Through the above process, the server 120 appoints the control device.

Meanwhile, if the server 120 determines not to perform an authentication process in step S305, the server 120 further determines whether to perform a help request process in step S340. If a help request message is received from the help-requesting device 110, the server 120 may be aware of the help request process.

After awareness of the help request process, the server 120 transmits the help request message to each device registered in the control device list in step S345. The server 120 receives a help authority request message from each device receiving the help request message in step S350.

The server 120 determines whether the device transmitting the help authority request message is registered in the control device list in step S355. If it is determined that the device is a registered device in the control device list, the server 120 regards the registered device as the control device 130 and then transmits a help authority approval message to the control device 130 in step S360.

The server 120 receives a control command from the control device 130 and then interprets the received control command in step S365. For interpretation, the server 120 may compare the received control command with prescribed control commands. Then the server 120 transmits the interpreted control command to the help-requesting device 110 in step S370. Alternatively, as described above, the server 120 may transmit the control command, as received, to the help-requesting device 110 and then the help-requesting device 110 may interpret the control command by itself.

The server 120 receives control results from the help-requesting device 110 in step S375 and then transmits the received control results to the control device 130 in step S380.

Figure 4:
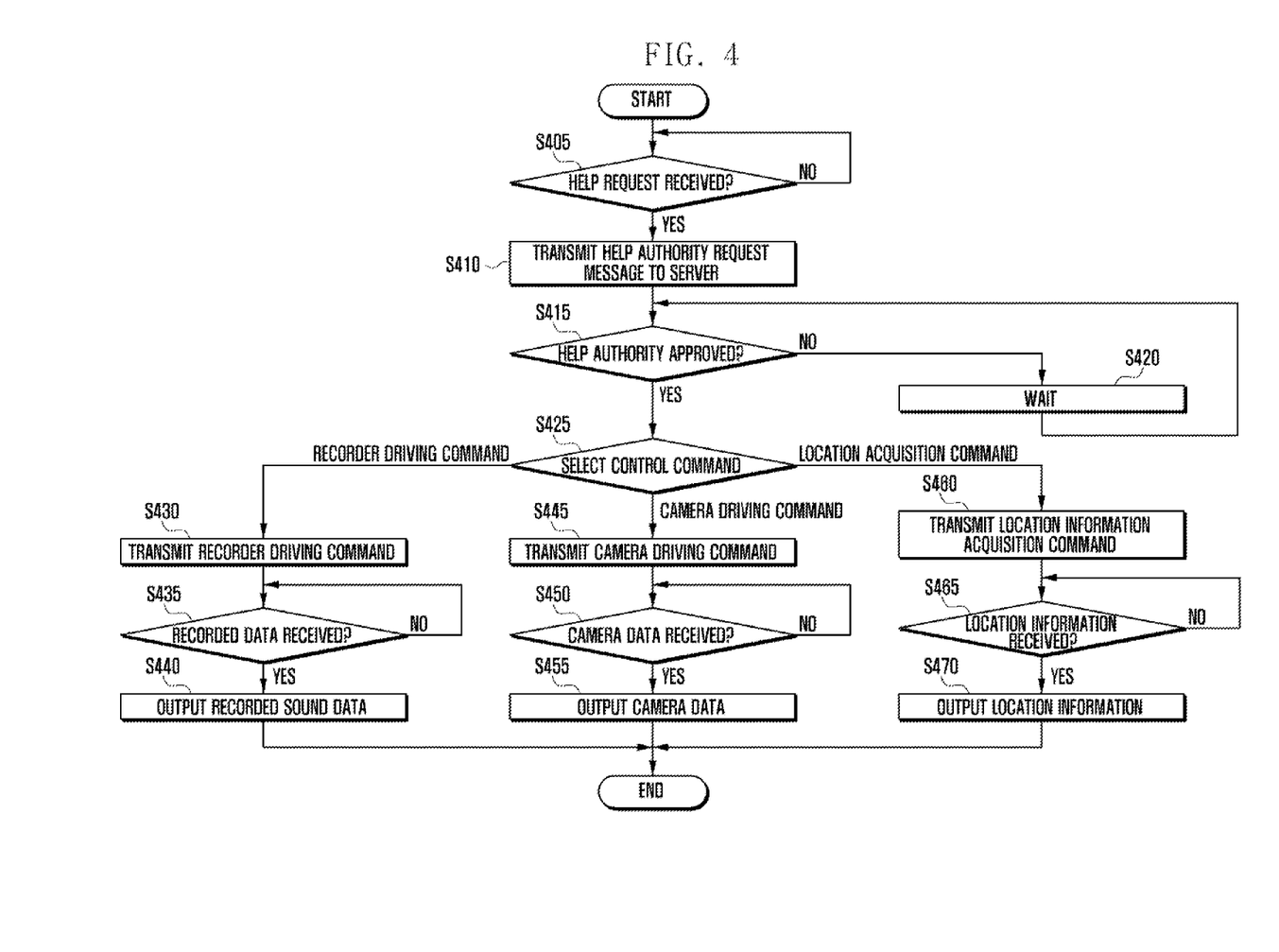
FIG. 4 is a flow diagram illustrating an operation process of a control device for an SOS service according to an exemplary embodiment of the present invention.

FIG. 4 is a flow diagram illustrating an operation process of a control device for an SOS service according to an exemplary embodiment of the present invention.

Referring to FIG. 4, at the outset, the control device 130 receives a help request message from the help-requesting device 110 through the server 120 in step S405. The control device 130 transmits a help authority request message to the server 120 to acquire an authorization to remotely control the help-requesting device 110 in step S410. The control device 130 determines whether a help authority approval message is received in step S415 and waits to receive it in step S420.

When the help authority approval message is received, the control device 130 selects a control command for remotely controlling the help-requesting device 110 in step S425.

If the control device selects a command for driving a recorder, the control device 130 transmits the recorder driving command to the help-requesting device 110 through the server 120 in step S430. As shown in Table 1, the recorder driving command is one of standardized control commands and may be in the form of an SMS message containing "AAAAA". Also, the control device 130 determines whether recorded sound data is received from the help-requesting device 110 in step S435. If it is determined that the recorded data is received, the control device 130 outputs recorded sound data in step S440.

If the control device selects a command for driving a camera, the control device 130 transmits the camera driving command to the help-requesting device 110 through the server 120 in step S445. As shown in Table 1, the camera driving command is one of standardized control commands and may be in the form of an SMS message containing "BBBBB". Also, the control device 130 determines whether camera data is received from the help-requesting device 110 in step S450. If it is determined that the camera data is received, the control device 130 outputs camera data in step S455.

If the control device selects a command for acquiring location information, the control device 130 transmits the location information acquisition command to the help-requesting device 110 through the server 120 in step S460. As shown in Table 1, the location information acquisition command is one of standardized control commands and may be in the form of an SMS message containing "CCCCC". Also, the control device 130 determines whether location information is received from the help-requesting device 110 in step S465. If it is determined that the location information is received, the control device 130 outputs location information in step S470.

Figure 5:
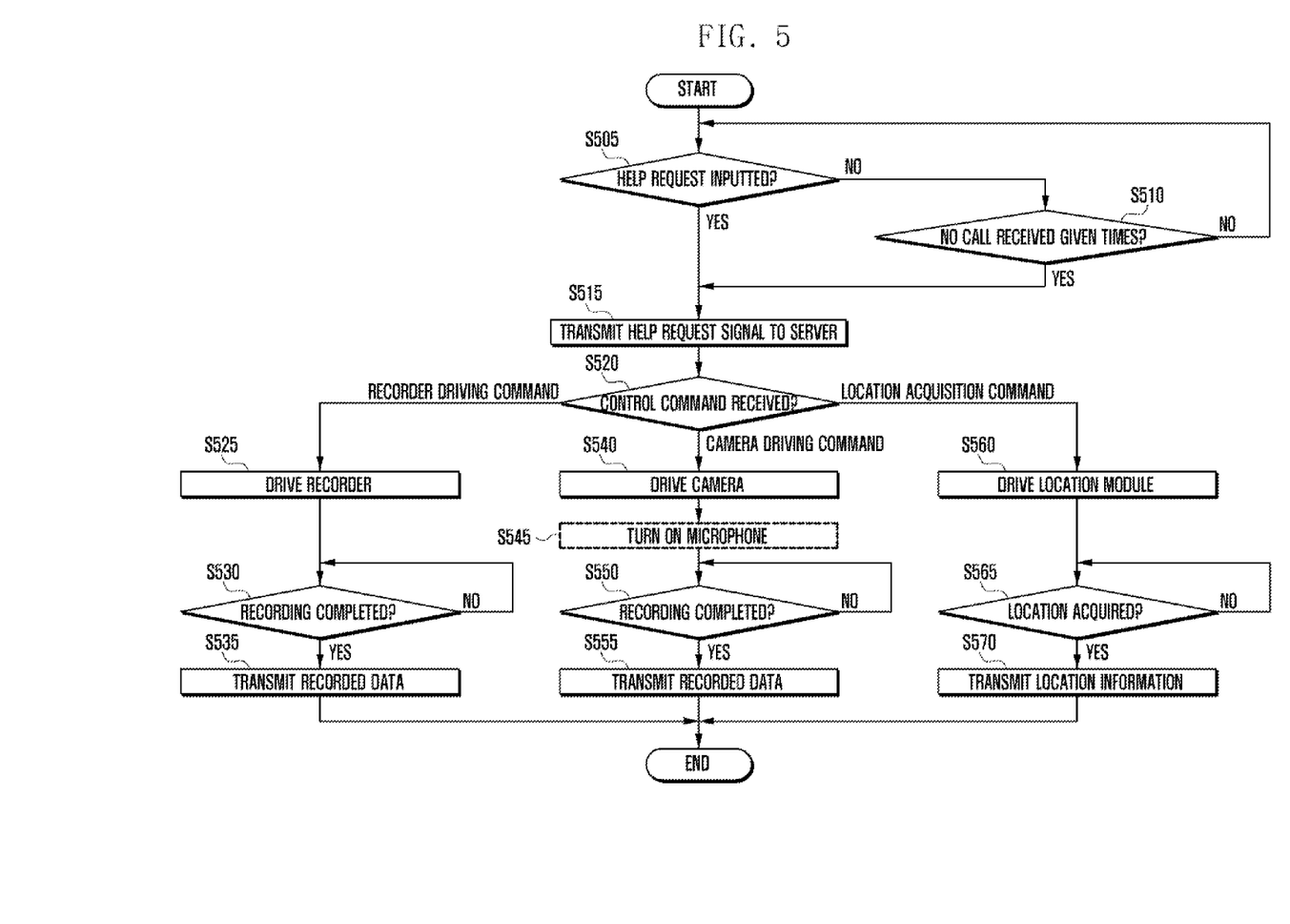
FIG. 5 is a flow diagram illustrating an operation process of a help-requesting device for an SOS service according to an exemplary embodiment of the present invention.

FIG. 5 is a flow diagram illustrating an operation process of a help-requesting device for an SOS service according to an exemplary embodiment of the present invention.

Referring to FIG. 5, at the outset, the help-requesting device 110 determines whether a help request signal is input in step S505. The help request signal may be input through a suitable SOS service menu or a preset hot key. If it is determined that the help request signal is not input, the help-requesting device 110 further determines whether an incoming call is not received several times more than preset incoming call times in step S510.

If it is determined that the help request signal is input or if the incoming call is not received the preset incoming call times, the help-requesting device 110 transmits the help request signal to the server 120 in step S515. Also, the help-requesting device 110 receives a control command from the server 120 and then determines the type of received control command in step S520.

If the received control command is a recorder driving command, the help-requesting device 110 drives a recorder in step S525. If a sound recording is completed in step S530, the help-requesting device 110 transmits recorded data to the server 120 in step S535.

If the received control command is a camera driving command, the help-requesting device 110 drives a camera in step S540 and also may turn on a microphone in step S545. Then, if a video recording or image capturing is completed in step S550, the help-requesting device 110 transmits recorded or captured data to the server 120 in step S555.

If the received control command is a location information acquisition command, the help-requesting device 110 drives a location information acquisition module in step S560. Then, if location information is acquired in step S565, the help-requesting device 110 transmits the location information to the server 120 in step S570.

Figure 6:
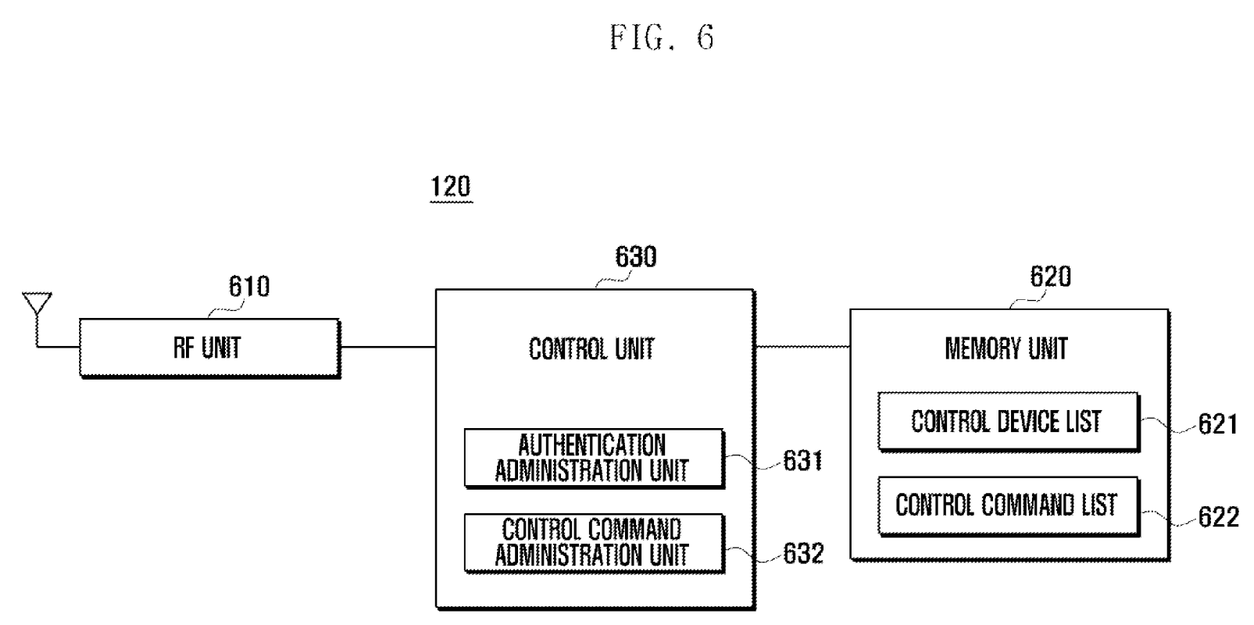
FIG. 6 is a block diagram illustrating a configuration of a server for an SOS service according to an exemplary embodiment of the present invention.

FIG. 6 is a block diagram illustrating a configuration of a server for an SOS service according to an exemplary embodiment of the present invention.

Referring to FIG. 6, the server 120 may include a Radio Frequency (RF) unit 610, a memory unit 620, and a control unit 630.

For wireless communication of the server 120, the RF unit 610 performs a function to transmit or receive data. The RF unit 610 may include an RF transmitter (not illustrated) that up-converts the frequency of an outgoing signal and then amplifies the signal, an RF receiver (not illustrated) that amplifies with low-noise an incoming signal and down-converts the frequency of the signal, and the like. The RF unit 610 may receive data through a wireless channel and then output it to the control unit 630, or receive data from the control unit 630 and then transmit it through a wireless channel. In an exemplary implementation, the RF unit 610 may receive a control command from the control device 130 and then transmit it to the help-requesting device 110. Additionally, the RF unit 610 may receive result data of control command execution from the help-requesting device 110 and then transmit it to the control device 130.

The memory unit 620 stores a variety of programs and data required for operations of the server 120 and may be composed of a program region and a data region. The program region may store an Operating System (OS) and programs for booting and operating the server 120. More particularly, the memory unit 620 of the server 120 according to an exemplary embodiment of the present invention may store a control device list 621 and a control command list 622. The control device list 621 indicates the control devices 130 that are capable of remotely controlling the help-requesting device 110 in emergency. The control command list 622 indicates control commands allowing the control device 130 to remotely control the help-requesting device 110 in emergency. The control command list is a standardized list that allows remote control between different kinds of devices.

The control unit 630 controls the operations of the server 120. More particularly, the control unit 630 authenticates the control devices 130 for remotely controlling the help-requesting device 110, interprets a control command received from the control device 130, and provides the interpreted control command to the help-requesting device 110. For the above described authentication, the control unit 630 may include an authentication administration unit 631 and a control command administration unit 632.

The authentication administration unit 631 receives a control device list from the help-requesting device 110. Then, in order to determine whether to register the control device 130 for the help-requesting device 110, the authentication administration unit 631 controls the transmission of a registration request message to each device in the control device list. If an approval message is received, the authentication administration unit 631 appoints the device transmitting the approval message as the control device 130.

The control command administration unit 632 controls the transmission and reception of a control command for controlling the help-requesting device 110 at a help request of the help-requesting device 110. More specifically, the control command administration unit 632 receives a control command (e.g., a recorder driving command, a camera driving command, a location information acquisition command, and the like) from the control device 130, interprets the received control command, and provides the interpreted control command to the help-requesting device 110. In an exemplary implementation, the control command administration unit 632 may forward the received control command, as it is, to the help-requesting device 110.

Figure 7:
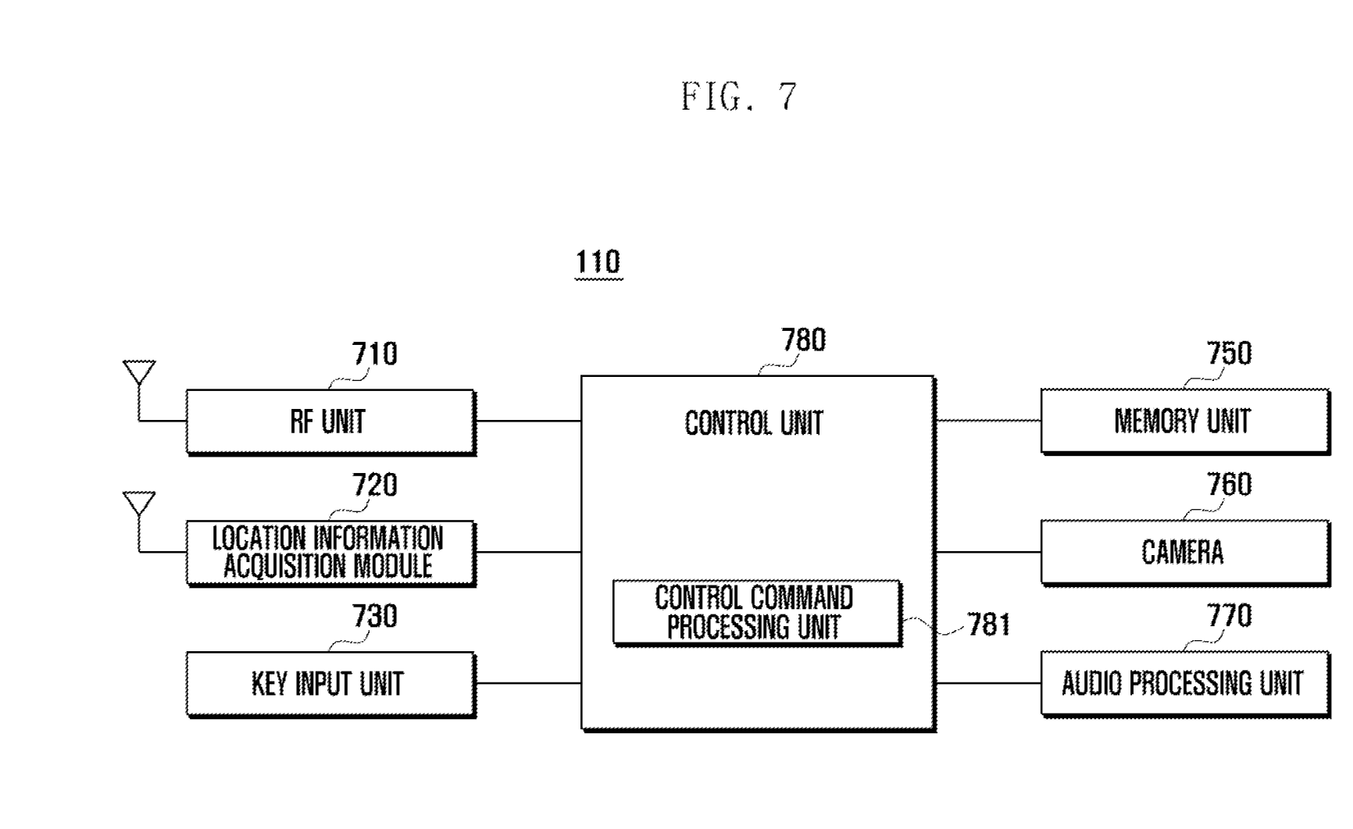
FIG. 7 is a block diagram illustrating a configuration of a help-requesting device for an SOS service according to an exemplary embodiment of the present invention.

FIG. 7 is a block diagram illustrating a configuration of a help-requesting device for an SOS service according to an exemplary embodiment of the present invention.

Referring to FIG. 7, the help-requesting device 110 may include an RF unit 710, a location information acquisition module 720, a key input unit 730, a display unit (not illustrated), a memory unit 750, a camera 760, an audio processing unit 770, and a control unit 780.

For wireless communication of the help-requesting device 110, the RF unit 710 performs a function to transmit or receive data. The RF unit 710 may include an RF transmitter (not illustrated) that up-converts the frequency of an outgoing signal and then amplifies the signal, an RF receiver (not illustrated) that amplifies with low-noise an incoming signal and down-converts the frequency of the signal, and the like. The RF unit 710 may receive data through a wireless channel and then output it to the control unit 780, or receive data from the control unit 780 and then transmit it through a wireless channel. In an exemplary implementation, the RF unit 710 may transmit a help request message to the server 120 and receive a control command from the server 120. Additionally, the RF unit 710 may transmit data created as the result of command execution to the server 120.

The location information acquisition module 720 obtains geographical location information (e.g., latitude and longitude data) on the help-requesting device 110. For example, the location information acquisition module 720 may be a Global Positioning System (GPS) module, a wireless Local Area Network (LAN) module such as a Wireless Internet Platform for Interoperability (WiPi), and the like. The location information acquisition module 720 may obtain geographical location information on the help-requesting device 110 in response to a location information acquisition signal of the control unit 780.

The key input unit 730 receives a user's input action for performing a function of the help-requesting device 110. For the above, the key input unit 730 may be formed of a keypad, a touch screen, or any other equivalent. In exemplary embodiments of the present invention, the key input unit 730 may separately have a hot key for directly initiating an SOS service.

The display unit 740 may be formed of a Liquid Crystal Display (LCD), Organic Light Emitting Diodes (OLEDs), an Active Matrix OLED (AMOLED), and the like. The display unit visually provides a menu, input data, function setting information and any other various information of the help-requesting device 110 to a user. Also, the display unit 740 outputs a booting screen, an idle screen, a menu screen, a call screen, and any other various application screens of the help-requesting device 110.

The memory unit 750 stores a variety of programs and data required for operations of the help-requesting device 110 and may be composed of a program region and a data region. Since the program region and the data region have been described above in connection with the server 120, a description thereof will be omitted. In an exemplary implementation, the memory unit 750 may store a control command list such that the help-requesting device 110 may directly interpret a control command received from the control device 130.

The camera 760 includes an image sensor that allows a captured image to be digitalized. The image sensor may be formed of a Complementary Metal Oxide Semiconductor (CMOS), a Charged Coupled Device (CCD), an N-type Metal Oxide Semiconductor (NMOS), and the like. When receiving a camera driving command, the camera 760 may buffer images captured through the image sensor and store the buffered images as result data of control command execution.

The audio processing unit 770 may include a microphone for collecting audio signals and a speaker for outputting audio signals. In an exemplary implementation, when receiving a recorder driving command, the audio processing unit 770 may record audio data by driving a microphone and store recorded audio data as result of control command execution.

The control unit 780 controls the operations of the help-requesting device 110. More particularly, the control unit 780 creates a control device list to transmit it to the server 120 and also executes a control command received from the control device 130. To execute the control command, the control unit 780 may have a control command processing unit 781.

The control command processing unit 781 receives a control command from the control device 130 through the server 120. Also, the control command processing unit 781 drives selected blocks of the help-requesting device 110 to perform a particular function in response to the received control command. More specifically, when receiving a recorder driving command, the control command processing unit 781 records audio data by driving a microphone of the audio processing unit 780. Also, when a camera driving command is received, the control command processing unit 781 stores image or video data by driving the camera 760. When a location information acquisition command is received, the control command processing unit 781 obtains the current location of the help-requesting device 110 by driving the location information acquisition module 720.

In addition, the control command processing unit 781 controls the transmission of result data of control command execution to the control device 130 through the server 120.

Figure 8:
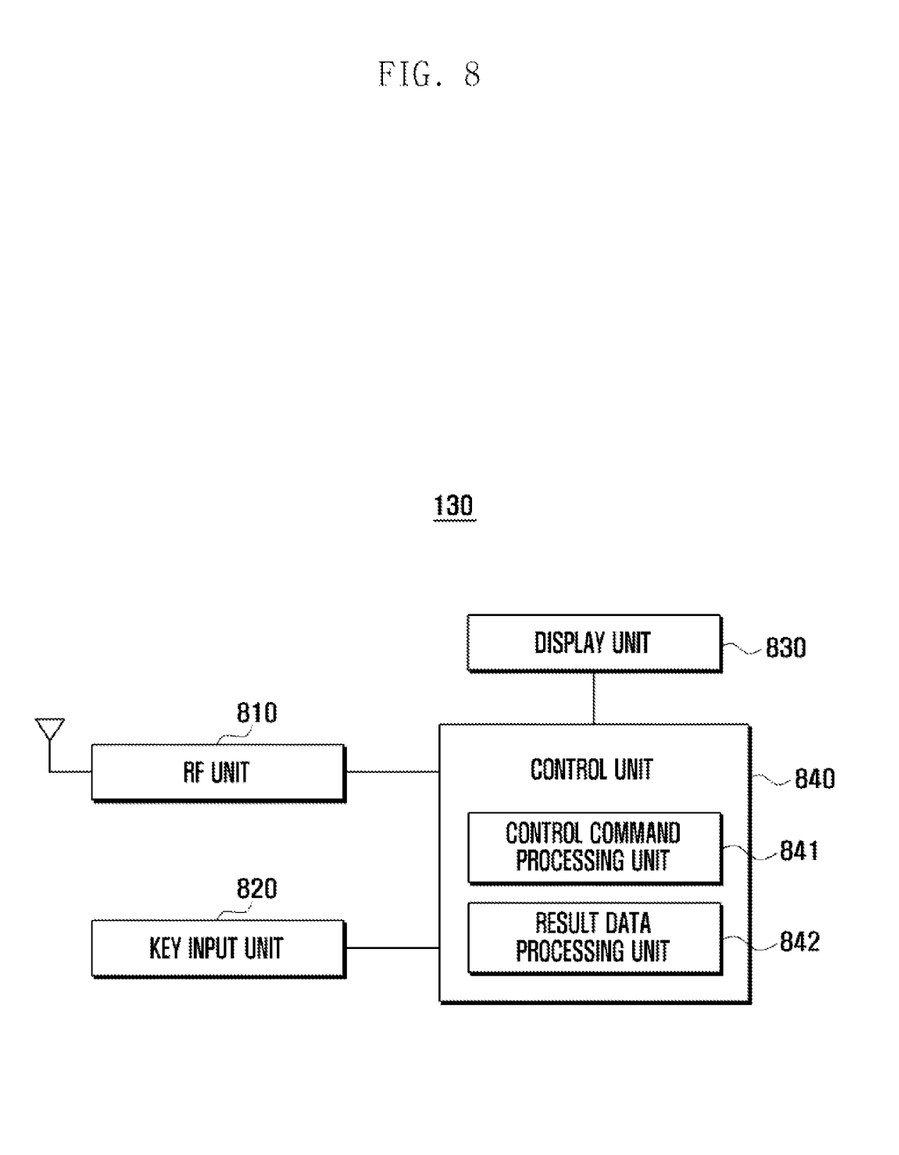
FIG. 8 is a block diagram illustrating a configuration of a control device for an SOS service according to an exemplary embodiment of the present invention.

FIG. 8 is a block diagram illustrating a configuration of a control device for an SOS service according to an exemplary embodiment of the present invention. Referring to FIG. 8, the control device 130 may include an RF unit 810, a key input unit 820, a display unit 830, and a control unit 840.

For wireless communication of the control device 130, the RF unit 810 performs a function to transmit or receive data. The RF unit 810 may include an RF transmitter (not illustrated) that up-converts the frequency of an outgoing signal and then amplifies the signal, an RF receiver (not illustrated) that amplifies with low-noise an incoming signal and down-converts the frequency of the signal, and the like. The RF unit 810 may receive data through a wireless channel and then output it to the control unit 840, or receive data from the control unit 840 and then transmit it through a wireless channel. In an exemplary implementation, the RF unit 810 may transmit a control command for remotely controlling the help-requesting device 110 to the server 120 and receive result data of control command execution from the help-requesting device 110.

The key input unit 820 receives a user's input action for performing a function of the control device 130. More particularly, the key input unit 820 may receive a user' input action corresponding to a control command.

The display unit 830 displays a state of the control device 130 and displays, in a visual manner, result data of control command execution received from the help-requesting device 110. The display unit 830 may display image/video data or location information received from the help-requesting device 110.

The control unit 840 controls the operations of the control device 130. More particularly, the control unit 840 creates a control command for remotely controlling the help-requesting device 110 to transmit it to the server 120. The control unit 840 also controls a series of processes of received result data of control command execution from the help-requesting device 110 and that informs a user about the result data. For the controlling of the operations, the control unit 840 may have a control command processing unit 841 and a result data processing unit 842.

The control command processing unit 841 receives a control command input by a user and transmits it to the server 120. The control command is standardized and is one of commands contained in the control command list. As described above, the control command may be provided in the form of an SMS message to the server 120.

The result data processing unit 842 receives result data of control command execution from the help-requesting device 110 and then outputs it in a user's recognizable means. More specifically, if the result data of control command execution is record data, the result data processing unit 842 outputs recorded sound data through a speaker. Also, if the result data of control command execution is camera data, the result data processing unit 842 outputs captured image data or recorded video data through the display unit 830. If the result data of control command execution is location information, the result data processing unit 842 visually outputs the location information through the display unit 830.

As described above, the control device receiving a help request from the help-requesting device can remotely control the help-requesting device and then obtain information about surroundings of the help-requesting device. Therefore, the SOS service according to an exemplary embodiment of the present invention may be more useful in helping or rescuing a user who is in danger, had an accident or involved in any other type of emergency.

Although each of the server and devices described above includes the control unit composed of at least one functional block for performing a particular function, the present invention is not limited thereto. Therefore, it should be understood by those skilled in the art that the above-described functions of the respective functional blocks may be favorably performed by the control unit itself While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for executing a command of a help-requesting device, the method comprising:
   determining whether a help request signal is input;
   determining whether an incoming call is not received more than a preset number of incoming call times when the help request signal is not input;
   transmitting a help request message to a control device through a server when it is determined that the incoming call is not received more than the preset number of incoming call times;
   receiving a control command for controlling the help-requesting device from the control device through the server;
   identifying a type of the control command based on a standardized control command list, each control command included in the standardized control command list corresponding to at least one device operation;
   executing the control command based on a result of the identification; and
   transmitting execution result data to the control device,
   wherein the control command comprises at least one of a recorder driving command, a camera driving command, and a location information acquisition command.

2. The method of claim 1, wherein the control command is included in a short message service (SMS) message.

3. The method of claim 1, wherein when the control command comprises the recorder driving command, the receiving of the control command comprises:
   receiving a recorder driving command from the control device through the server.

4. The method of claim 3, wherein the transmitting of the execution result data comprises:
   transmitting recorder driving result data to the control device through the server.

5. A method for a remote control of a control device, the method comprising:
   receiving a help request message from a help-requesting device through a server when it is determined by the help-requesting device that an incoming call is not received more than a preset number of incoming call times when a help request signal is not input on the help-requesting device;
   acquiring an authorization to remotely control the help-requesting device from the server;
   transmitting a control command for controlling the help-requesting device to the help-requesting device through the server; and
   receiving execution result data from the help-requesting device,
   wherein a type of the control command is identified based on a standardized control command list by the help-requesting device,
   wherein each control command included in the standardized control command list corresponds to at least one device operation, and
   wherein the control command comprises at least one of a recorder driving command, a camera driving command, and a location information acquisition command.

6. The method of claim 5, wherein the control command is included in a short message service (SMS) message.

7. The method of claim 5, wherein when the control command comprises the recorder driving command, the transmitting of the control command comprises:
   creating a control command for driving a recorder of the help-requesting device; and
   transmitting the recorder driving command to the help-requesting device through the server.

8. The method of claim 7, further comprising:
   receiving a recorder driving result data from the help-requesting device through the server; and
   outputting sound data included in the recorder driving result data.

9. A method for a remote control between mobile devices of a server, the method comprising:
   transmitting a help request message to a control device in response to receiving the help request message from help-requesting device;
   authenticating a remote control authorization of a control device;

transmitting a control command for controlling the help-requesting device to the help-requesting device in response to receiving the control command from the control device; and transmitting an execution result data to the control device in response to receiving the execution result data from the help-requesting device, wherein a type of the control command is identified based on a standardized control command list by the help-requesting device, wherein each control command included in the standardized control command list corresponds to at least one device operation, wherein the help request message is received from the help-requesting device when it is determined by the help-requesting device that an incoming call is not received more than a preset number of incoming call times when a help request signal is not input on the help-requesting device, and wherein the control command comprises at least one of a recorder driving command, a camera driving command, and a location information acquisition command.

10. The method of claim 9, wherein the control command is included in a short message service (SMS) message.

11. The method of claim 9, further comprising:
before the transmitting of the help request message, receiving a control device list from the help-requesting device;
transmitting a registration request message to each device included in the control device list; and
registering a device transmitting an approval message in response to the registration request message as the control device.

12. An apparatus for executing a command, the apparatus comprising:
a transceiver configured to:
transmit a signal, and
receive a signal; and
a controller configured to:
determine whether a help request signal is input,
determine whether an incoming call is not received more than a preset number of incoming call times when the help request signal is not input,
transmit a help request message to a control device through a server when it is determined that the incoming call is not received more than the preset number of incoming call times,
receive a control command for controlling the help-requesting device from the control device through the server,
identify a type of the control command based on a standardized control command list, wherein each control command included in the standardized control command list corresponds to at least one device operation,
execute the control command based on a result of the identification, and
transmit execution result data to the control device,
wherein the control command comprises at least one of a recorder driving command, a camera driving command, and a location information acquisition command.

13. The apparatus of claim 12,
wherein the control command is included in a short message service (SMS) message, and
wherein the control command comprises at least one of a recorder driving command, a camera driving command, and a location information acquisition command.

14. The apparatus of claim 12, wherein when the control command comprises the recorder driving command, the controller is further configured to:

receive a recorder driving command from the control device through the server, and
transmit recorder driving result data to the control device through the server.

15. An apparatus for remotely controlling a device, the apparatus comprising:
a transceiver configured to:
transmit a signal, and
receive a signal; and
a controller configured to:
receive a help request message from a help-requesting device through a server when it is determined by the help-requesting device that an incoming call is not received more than a preset number of incoming call times when a help request signal is not input on the help-requesting device,
acquire an authorization to remotely control the help-requesting device from the server,
transmit a control command for controlling the help-requesting device to the help-requesting device through the server, and
receive execution result data from the help-requesting device,
wherein a type of the control command is identified command based on a standardized control command list by the help-requesting device,
wherein each control command included in the standardized control command list corresponds to at least one device operation, and
wherein the control command comprises at least one of a recorder driving command, a camera driving command, and a location information acquisition command.

16. The apparatus of claim 15, wherein when the control command comprises the recorder driving command, the controller is further configured to:
create a control command for driving a recorder of the help-requesting device, and
transmit the recorder driving command to the help-requesting device through the server.

17. The apparatus of claim 15, wherein the controller receives a recorder driving result data from the help-requesting device through the server, and outputs sound data included in the recorder driving result data.

18. An server for a remote control between mobile devices: the server comprising:
a transceiver configured to:
transmit a signal, and
receive a signal; and
a controller configured to:
transmit a help request message to a control device in response to receiving the help request message from help-requesting device,
authenticate a remote control authorization of a control device,
transmit a control command for controlling the help-requesting device to the help-requesting device in response to receiving the control command from the control device, and
transmit an execution result data to the control device in response to receiving the execution result data from the help-requesting device,
wherein a type of the control command is identified based on a standardized control command list by the help-requesting device,
wherein each control command included in the standardized control command list corresponds to at least one device operation, wherein the help request message is received from the help-requesting device when it is determined by the help-requesting device that an incoming call is not received more than a preset number of incoming call times when a help request signal is not input on the help-requesting device, and wherein the control command comprises at least one of a recorder driving command, a camera driving command, and a location information acquisition command.

19. The server of claim 18, wherein the control command is included in a short message service (SMS) message, and wherein the controller is further configured to:
  receive a control device list from the help-requesting device before the transmitting of the help request message,
  transmit a registration request message to each device included in the control device list, and
  register a device transmitting an approval message in response to the registration request message as the control device.

\* \* \* \* \*